(12) United States Patent
Yoon et al.

(10) Patent No.: US 9,410,008 B2
(45) Date of Patent: Aug. 9, 2016

(54) ELASTIC TERPOLYMER INCLUDING DIENE GROUP AND PREPARATION METHOD THEREOF

(71) Applicant: LG CHEM, LTD., Seoul (KR)

(72) Inventors: Sung-Cheol Yoon, Daejeon (KR);
Sung-Ho Park, Daejeon (KR);
Jun-Seok Ko, Daejeon (KR);
Soo-Young Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/437,419

(22) PCT Filed: Oct. 14, 2013

(86) PCT No.: PCT/KR2013/009154
§ 371 (c)(1),
(2) Date: Apr. 21, 2015

(87) PCT Pub. No.: WO2015/012435
PCT Pub. Date: Jan. 29, 2015

(65) Prior Publication Data
US 2015/0274874 A1    Oct. 1, 2015

(30) Foreign Application Priority Data

Jul. 22, 2013 (KR) .......................... 10-2013-0086216

(51) Int. Cl.
*C08F 210/18* (2006.01)
*C08F 236/20* (2006.01)

(52) U.S. Cl.
CPC .............. *C08F 236/20* (2013.01); *C08F 210/18* (2013.01)

(58) Field of Classification Search
CPC .............. C08F 210/18; C08F 2500/09; C08F 2500/17; C08L 23/16
See application file for complete search history.

(56) References Cited

U.S. PATENT DOCUMENTS

| | | | |
|---|---|---|---|
| 5,229,478 A | 7/1993 | Floyd et al. | |
| 5,571,883 A * | 11/1996 | Jourdain | F16F 1/3605 524/570 |
| 5,807,946 A * | 9/1998 | Jourdain | F16G 1/14 526/282 |
| 5,902,867 A | 5/1999 | Muskens et al. | |
| 6,225,427 B1 | 5/2001 | Burton et al. | |
| 6,372,847 B1 * | 4/2002 | Wouters | C08L 23/10 525/191 |
| 6,545,088 B1 | 4/2003 | Kolthammer et al. | |
| 7,119,157 B2 * | 10/2006 | Kim | C08F 10/00 526/282 |
| 8,962,761 B2 * | 2/2015 | Tse | C08L 9/00 525/193 |
| 2005/0239666 A1 | 10/2005 | Tanaglia | |
| 2006/0058481 A1 | 3/2006 | Ravishankar | |
| 2011/0275764 A1 * | 11/2011 | Ellul | C08L 23/10 525/210 |

FOREIGN PATENT DOCUMENTS

| | | |
|---|---|---|
| CN | 1224433 A | 7/1999 |
| CN | 1254350 A | 5/2000 |
| CN | 102482366 A | 5/2012 |
| EP | 1113028 B1 | 3/2004 |
| EP | 0521908 B2 | 10/2006 |
| EP | 2093240 A1 | 8/2009 |
| EP | 2883891 A1 | 6/2015 |
| EP | 3000832 A1 | 3/2016 |
| JP | 2000-256423 A | 9/2000 |
| JP | 2001-522398 A | 11/2001 |
| JP | 2005-263842 A | 9/2005 |
| JP | 2010-241933 A | 10/2010 |
| JP | 2012-531503 A | 12/2012 |
| KR | 10-1999-0022924 A1 | 3/1999 |
| KR | 1999-028655 A1 | 4/1999 |
| KR | 10-0488833 A1 | 5/2005 |
| KR | 10-2006-0054293 A1 | 5/2006 |
| KR | 10-0623106 A1 | 9/2006 |
| KR | 10-0820542 B1 | 4/2008 |
| KR | 10-2009-0116737 A1 | 11/2009 |
| KR | 10-2010-0090714 A1 | 8/2010 |
| KR | 10-0976131 B1 | 8/2010 |

* cited by examiner

*Primary Examiner* — Rip A Lee
(74) *Attorney, Agent, or Firm* — Dentons US LLP

(57) ABSTRACT

The present invention relates to an elastic terpolymer which can satisfy excellent processability and elasticity (flexibility) at the same time, and a preparation method thereof. The elastic terpolymer is a copolymer of 40 to 70 weight % of ethylene, 15 to 55 weight % of a $C_3$-$C_{20}$ alpha-olefin, and 0.5 to 20 weight % of a diene obtained in the presence of a group 4 transition metal catalyst, of which i) the weight average molecular weight measured by GPC is 100,000 to 500,000, and ii) the Mooney viscosity (ML) and the Mooney relaxation area (MLR) measured by a Mooney viscometer (1+4+2 @125° C.) can satisfy a specific relation.

5 Claims, 4 Drawing Sheets

ELASTIC TERPOLYMER INCLUDING DIENE GROUP AND PREPARATION METHOD THEREOF

This application is a National Stage Entry of International Application No. PCT/KR2013/009154, filed on Oct. 14, 2013, which claims priority to and the benefit of Korean Patent Application No. 10-2013-0086216, filed on Jul. 22, 2013, all of which are hereby incorporated herein by reference in their entirety.

TECHNICAL FIELD

The present invention relates to an elastic terpolymer that is a copolymer of ethylene, alpha-olefin, and diene, and a preparation method thereof. More specifically, the present invention relates to an elastic terpolymer having a long-chain branch which can satisfy processability and elasticity (flexibility) at the same time, and a preparation method thereof.

BACKGROUND OF ART

EPDM rubber, an elastic terpolymer of ethylene, an alpha-olefin such as propylene, and a diene such as ethylidene norbornene, has the molecular structure not including an unsaturated bond in the main chain, and has the characteristics of weather resistance, chemical resistance, and heat resistance that are superior to general conjugated diene rubbers. Due to the characteristics, the elastic terpolymer such as the EPDM rubber has been widely used as a material for the industrial materials such as for all sorts of automobile parts, electrical wire, construction and all sorts of hoses, gaskets, belts, bumpers, and a blend with plastics.

The elastic terpolymer such as the EPDM rubber has been mostly prepared by copolymerizing 3 kinds of monomers in the presence of a catalyst including a vanadium compound, for example, a vanadium-based Ziegler-Natta catalyst. However, since the vanadium-based catalyst has low catalytic activity, there is a need to use an excess amount of catalyst and a disadvantage that a residual metal content increases in the terpolymer. Therefore, processes for catalyst elimination and decolorization are required after the preparation of the terpolymer, and the residual catalyst in the resin may cause problems of heat resistance deterioration, impurity generation, hindrance to a vulcanization reaction, and so on. Further, it has not been easy to prepare the elastic terpolymer by using the catalyst including a vanadium compound due to its low polymerization activity and the polymerization condition of a low temperature, and it has been difficult to control the molecular structure of the copolymer because it has not been easy to control the uptake rate of comonomers such as propylene and diene. Therefore, in the case of using the vanadium-based catalyst, there has been a limit on the preparation of the elastic terpolymer with various properties. Recently, because of the problems, a method of preparing the elastic terpolymer, such as the EPDM rubber, by using a metallocene-based group 4 transition metal catalyst instead of the vanadium-based Ziegler-Natta catalyst has been under development.

Such group 4 transition metal catalyst shows high polymerization activity in the polymerization of olefins, and makes it possible not only to prepare a copolymer having a higher molecular weight but also to easily control the molecular weight distribution and the composition of the copolymer. Furthermore, it has an advantage of enabling the copolymerization of various comonomers. For example, U.S. Pat. Nos. 5,229,478 and 6,545,088, and Korea Pat. No. 0,488,833 disclose that an elastic terpolymer having a high molecular weight can be obtained with excellent polymerization activity by using various metallocene-based group 4 transition metal catalysts obtained from the ligands such as cyclopentadienyl, indenyl, fluorenyl, and so on.

Such group 4 transition metal catalyst shows high polymerization activity in the polymerization of olefins, and makes it possible not only to prepare a copolymer having a higher molecular weight but also to easily control the molecular weight distribution and the composition of the copolymer. Furthermore, it has an advantage of enabling the copolymerization of various comonomers. For example, U.S. Pat. Nos. 5,229,478 and 6,545,088, and Korea Pat. No. 0,488,833 disclose that an elastic terpolymer having a high molecular weight can be obtained with excellent polymerization activity by using various metallocene-based group 4 transition metal catalysts obtained from the ligands such as cyclopentadienyl, indenyl, fluorenyl, and so on.

However, in the case of polymerizing 3 kinds of monomers by using existing group 4 transition metal catalysts, there has been a disadvantage that the repeating units derived from the monomers are unevenly distributed in the terpolymer chain due to their high reactivity to the comonomers of alpha-olefin. As a result, it has been difficult to obtain the elastic terpolymer such as the EPDM rubber having excellent elasticity and flexibility.

Further, U.S. Pat. No. 5,902,867 discloses the method of lowering the viscosity of the polymer by widening the molecular weight distribution for improving the mixing processability and the extrusion processability of the EPDM, but there is a problem that the polymer is degraded during the process by the low molecular components included in the cross-linked rubber product, and the surface characteristics and the low temperature characteristics decrease.

Therefore, it has been continuously required to develop an elastic terpolymer that can satisfy excellent processability, mechanical properties, and elasticity (flexibility) at the same time, and a preparation method that can prepare the elastic terpolymer with high productivity and yield rate.

PRIOR ART DOCUMENTS

Patent Documents (Patent Document 0001) U.S. Pat. No. 5,229,478
(Patent Document 0002) U.S. Pat. No. 6,545,088
(Patent Document 0003) Korean Pat. No. 0,488,833
(Patent Document 0004) U.S. Pat. No. 5,902,867

DETAILED DESCRIPTION OF THE INVENTION

Technical Problem

It is an aspect of the present invention to provide an elastic terpolymer having a long-chain branch which can satisfy excellent processability and elasticity (flexibility) at the same time.

It is another aspect of the present invention to provide a preparation method thereof which can produce the elastic terpolymer having a long-chain branch with high productivity.

Technical Solution

The present invention provides an elastic terpolymer of 40 to 70 weight % of ethylene, 15 to 55 weight % of a $C_3$-$C_{20}$ alpha-olefin, and 0.5 to 20 weight % of a diene obtained in the presence of a group 4 transition metal catalyst, of which i) the weight average molecular weight measured by GPC is 100,000 to 500,000, and ii) the Mooney viscosity (ML) and the Mooney relaxation area (MLR) measured by a Mooney viscometer (1+4+2ⓐ125° C.) satisfy the following General Equation 1:

$$[MLR/(ML)^2]*100 \geq 8 \qquad \text{[General Equation 1]}$$

The present invention also provides a method of preparing the elastic terpolymer, including the step of copolymerizing the monomer composition including 40 to 70 weight % of ethylene, 20 to 50 weight % of a $C_3$-$C_{20}$ alpha-olefin, and 2 to 20 weight % of a diene while continuously feeding the composition into a reactor, in the presence of the catalyst composition including a first transition metal compound represented by the following Chemical Formula 1 and a second transition metal compound represented by the following Chemical Formula 2.

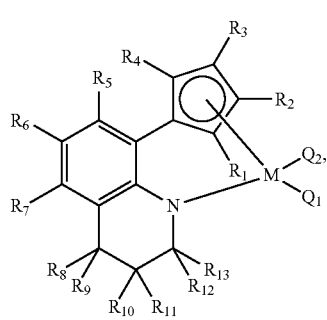

[Chemical Formula 1]

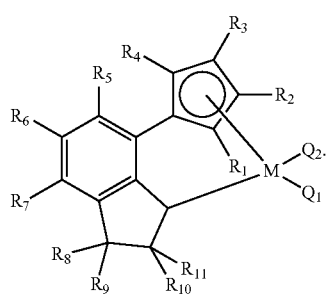

[Chemical Formula 2]

In Chemical Formulae 1 and 2, $R_1$ to $R_{13}$ may be equal to or different from each other, and may independently be hydrogen, a $C_1$-$C_{20}$ alkyl radical, a $C_2$-$C_{20}$ alkenyl radical, a $C_6$-$C_{20}$ aryl radical, a silyl radical, a $C_7$-$C_{20}$ alkylaryl radical, a $C_7$-$C_{20}$ arylalkyl radical, or a metalloid radical of a group 4 metal substituted with a hydrocarbyl, wherein the 2 different neighboring groups among $R_1$ to $R_{13}$ may form an aliphatic ring or an aromatic ring by being connected with an alkylidene radical including a $C_1$-$C_{20}$ alkyl or a $C_6$-$C_{20}$ aryl radical;

M is a group 4 transition metal; and $Q_1$ and $Q_2$ may be equal to or different from each other, and may independently be a halogen radical, a $C_1$-$C_{20}$ alkyl radical, a $C_2$-$C_{20}$ alkenyl radical, a $C_6$-$C_{20}$ aryl radical, a $C_7$-$C_{20}$ alkylaryl radical, a $C_7$-$C_{20}$ arylalkyl radical, a $C_1$-$C_{20}$ alkylamido radical, a $C_6$-$C_{20}$ arylamido radical, or a $C_1$-$C_{20}$ alkylidene radical.

Hereinafter, the elastic terpolymer according to a specific embodiment of the present invention and the method of preparing the same are explained in more detail.

First of all, the term 'elastic terpolymer' used in this description may be defined as follows, unless there is particular mention about it. The term 'elastic terpolymer' may refer to an arbitrary elastic copolymer (for example, a cross-linkable random copolymer) copolymerized from 3 kinds of monomers of ethylene, a $C_3$-$C_{20}$ alpha-olefin, and a diene. A representative example of such 'elastic terpolymer' is the EPDM rubber, which is a copolymer of ethylene, propylene, and a diene. However, the term 'elastic terpolymer' is not limited to only the copolymer of the three monomers, and it goes without saying that it may include an arbitrary elastic copolymer prepared from one or more monomers belonging to the category of alpha-olefin and one or more monomers belonging to the category of diene in company with ethylene. For example, as the elastic copolymer of ethylene, 2 kinds of alpha-olefins of propylene and 1-butene, and 2 kinds of dienes of ethylidene norbornene and 1,4-hexadiene, may also belong to the category of the 'elastic terpolymer' because it is copolymerized from 3 kinds of monomers respectively belonging to the categories of ethylene, alpha-olefin, and diene.

Meanwhile, according to one embodiment of the invention, an elastic terpolymer of 40 to 70 weight % of ethylene, 15 to 55 weight % of a $C_3$-$C_{20}$ alpha-olefin, and 0.5 to 20 weight % of a diene obtained in the presence of a group 4 transition metal catalyst, of which i) the weight average molecular weight measured by GPC is 100,000 to 500,000, and ii) the Mooney viscosity (ML) and the Mooney relaxation area (MLR) measured by a Mooney viscometer (1+4+2ⓐ125° C.) satisfy the following General Equation 1 is provided.

$$[MLR/(ML)^2]*100 \geq 8 \qquad \text{[General Equation 1]}$$

Such elastic terpolymer of one embodiment is copolymerized from 3 kinds of monomers of ethylene, an alpha-olefin, and a diene in a certain content range and has relatively high weight average molecular weight of about 100,000 to 500,000, or about 100,000 to 400,000, measured by GPC. Such a high weight average molecular weight is achieved by excellent activity of the group 4 transition metal catalyst, for example, the first and second transition metal compounds belonging to the metallocene series represented by Chemical Formulae 1 and 2 disclosed below, and since the elastic terpolymer of one embodiment has such a high molecular weight, the elastic terpolymer, for example, the EPDM rubber, can show excellent mechanical properties.

Further, the Mooney viscosity (ML) and the Mooney relaxation area (MLR) of the terpolymer of one embodiment measured by a Mooney viscometer (1+4+2ⓐ125° C.) may satisfy the following General Equation 1.

$$[MLR/(ML)^2]*100 \geq 8 \qquad \text{[General Equation 1]}$$

In the General Equation 1, ML is the Mooney viscosity, and MLR is the integration value of the Mooney stress relaxation during 2 min from when 1 s has passed after the rotor stops, and it may be represented by the following General Equation 2.

$$MLR = \frac{k}{\alpha+1}[t^{[\alpha+1]}-1] \qquad \text{[General Equation 2]}$$

$M$ = Mooney Viscometer torque($MU$)

$k$ = intercept $\alpha$ = slope $t$ = measuring time

The terpolymer of one embodiment satisfying such relation, particularly, can show a high containing ratio of the long-chain branch. In this way, since the terpolymer includes a plurality of long-chain branches, it is possible to satisfy more improved elasticity and flexibility at the same time in addition to superior mechanical properties.

The elastic terpolymer according to one embodiment, for example, may be prepared with excellent productivity and yield rate unique to the group 4 transition metal catalyst belonging to the metallocene series, and it can satisfy excellent elasticity and flexibility in addition to high molecular weight and excellent mechanical properties according to this, while resolving the problems of the EPDM rubber prepared by an existing metallocene-type group 4 transition metal catalyst. Therefore, the elastic terpolymer of such one embodiment can be used very preferably as the EPDM rubber prepared by the group 4 transition metal catalyst.

Meanwhile, in the elastic terpolymer of one embodiment, the Mooney viscosity (ML) and the Mooney relaxation area (MLR) may be measured by the following method. After initially polymerizing and preparing the elastic terpolymer, for example, it is possible to measure the Mooney viscosity (ML) and the Mooney relaxation area (MLR) of each terpolymer by using a Mooney viscometer MV 2000 of Monsanto Co., and the relation graph thereof such as the Mooney relaxation curve can be drawn. Such a graph, for example, may be drawn like FIGS. 1 and 2.

Specifically, the graphs of the Mooney viscosity (ML), the Mooney relaxation area (MLR), and the relation thereof may be measured by treating the sample at 125° C. with a 1+4+2 condition, wherein the sample is obtained by treating each terpolymer with an antioxidant and making the same into a sheet by using a press mold. That is, the graphs of the Mooney viscosity (ML), the Mooney relaxation area (MLR), and the relation thereof may be obtained by preheating the sample for 1 min, measuring the Mooney viscosity for 4 min, and measuring the Mooney stress relaxation for 2 min.

Meanwhile, the content of the long-chain branch in the copolymer may be evaluated as the ratio of the Mooney viscosity (ML) and the Mooney relaxation area (MLR), and the relaxation time in the stress relaxation and the MLR may be swayed by the high molecular weight polymer in the copolymer. Generally, the low molecular weight polymer is rapidly relaxed and decreases the MLR but the high molecular weight polymer is more slowly relaxed and can increase the MLR. Likewise, the short-chain branch in the polymer is rapidly relaxed and decreases the MLR but the long-chain branch in the polymer can remarkably increase the molecular weight and increase the MLR. Therefore, the ratio of the ML and the MLR can be the criterion of the degree of the long-chain branch in the olefin-based elastic copolymer.

From the results of the relation of the Mooney viscosity (ML) and the Mooney relaxation area (MLR) of the elastic terpolymer of one embodiment obtained by the above method, it is recognized that the elastic terpolymer has a higher content of the long-chain branch than the EPDM rubbers prepared by using existing group 4 transition metal catalysts, and can satisfy the relation of General Equation 1.

Particularly, the elastic terpolymer satisfying General Equation 1 is suitable for the extrusion and injection process and can satisfy more improved elasticity and flexibility at the same time in addition to superior mechanical properties, because it has a large amount of the long-chain branch. Meanwhile, when the [MLR/(ML)$^2$]*100 value of General Equation 1 does not satisfy the value of 8 or more and shows an apparently low value, for example, less than 5, it may be regarded as a linear structure essentially not including a branch and the copolymer having such linear structure may have trouble in the process.

Furthermore, the elastic terpolymer may have the MLR/ML value of 3 or more. As disclosed above, the ratio of the ML and the MLR may be the criterion of the degree of the long-chain branch in the copolymer. The copolymer having the MLR/ML value of 3 or more is superior in processability and is suitable for the extrusion molding, but on the contrary, the copolymer having low MLR/ML value of less than 3 may be the copolymer of a linear structure and have low processability.

Further, the elastic terpolymer of one embodiment may have the Mooney viscosity range capable of satisfying the properties suitable to the EPDM rubber, for example, the Mooney viscosity of 20 MU or more, about 20 MU to 150 MU, or about 20 MU to 130 MU. When the Mooney viscosity of the elastic terpolymer is less than 20 MU, the difference in the processability according to the long-chain branch does not appear, and when it exceeds 150 MU, it may not be economical because the copolymer shows high viscosity and the productivity of resin decreases.

That is, the elastic terpolymer is prepared by using a group 4 transition metal catalyst so as to have excellent productivity, yield rate, and mechanical properties, and can be used for the EPDM rubber very preferably because it has a certain range of weight average molecular weight, the Mooney viscosity, and the ratio of the Mooney viscosity (ML) and the Mooney relaxation area (MLR) by including a specific diene, and can show more excellent processability, elasticity, and flexibility required for the EPDM rubber.

Meanwhile, the elastic terpolymer of one embodiment may have the molecular weight distribution (polydispersity index, PDI) of 2 to 6, and preferably 2 to 4. The molecular weight distribution (PDI) means the rate (Mw/Mn) of weight average molecular weight (Mw) per number average molecular weight (Mn). When the PDI is less than 2, it is difficult to introduce the long-chain branch to the polymer and the processability may decrease, and when the PDI is larger than 6, the processability is excellent but the surface characteristic may deteriorate because the low molecular weight polymer is included in the terpolymer and separated during processing.

The elastic terpolymer of one embodiment may have density capable of satisfying the properties suitable for the EPDM rubber, for example, density of about 0.840 to 0.895 g/cm$^3$, or about 0.850 to 0.890 g/cm$^3$.

In the elastic terpolymer of one embodiment, the alpha-olefin may be one or more $C_3$-$C_{20}$ alpha-olefins such as propylene, 1-butene, 1-hexene, 1-octene, 1-pentene, 4-methyl-1-pentene, 1-hexene, 1-heptene, 1-decene, 1-undecene, 1-dodecene, 1-tridecene, 1-tetradecene, 1-pentadecene, 1-hexadecene, 1-heptadecene, 1-nonadecene, 9-methyl-1-decene, 11-methyl-1-dodecene, 12-ethyl-1-tetradecene, and so on. Among them, $C_3$-$C_{10}$ alpha-olefins, for example, propylene, 1-butene, 1-hexene, or 1-octene, may be appropriately used.

Furthermore, as the diene, unconjugated diene-based monomers may be used. For example, 5-1,4-hexadiene, 1,5-heptadiene, 1,6-octadiene, 1,7-nonadiene, 1,8-decadiene, 1,12-tetradecadiene, 3-methyl-1,4,-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5,-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 7-methyl-1,6-octadiene, 4-methyl-1,4-nonadiene, ethylidene-2-norbornene, 5-methylene-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, dimethyl-3-butenyl)-2-norbornene, 5-(2-ethyl- 3-butenyl)-2-norbornene, 5-(6-heptenyl)-2-norbornene, 5-(3-methyl-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene, 5-propylidene-2-norbornene, 5-isopropylidene-2-norbornene, 5-butylidene-2-norbornene, 5-isobutylidene-2-norbornene, 2,3-diisopropylidene-5-norbornene, 2-ethylidene-3-isopropylidene-5-norbornene, or 2-propenyl-2,2-norbornadiene may be used, and one or more dienes selected from them may be used.

Particularly, the elastic terpolymer of one embodiment satisfying the weight average molecular weight and Δ tan δ may be prepared by using 5-ethylidene-2-norbornene, 5-methylene-2-norbornene, or 4-hexadiene preferably among the dienes. Meanwhile, since 5-vinyl-2-norbornene (VNB) or dicyclopentadiene (DCPD) that have been used for preparing the existing elastic terpolymer includes 2 double bonds and said 2 double bonds participate in the polymerization reaction and form a cross-linked polymer structure, there are some limits that gel particles are formed in the polymerization process or it is difficult to control the molecular weight of the terpolymer and the polymerization reaction.

Meanwhile, according to another embodiment of the invention, a method of preparing said elastic terpolymer of one embodiment is provided. The method of preparing the elastic terpolymer may include the step of copolymerizing the monomer composition including 40 to 70 weight % of ethylene, 20 to 50 weight % of a $C_3$-$C_{20}$ alpha-olefin, and 2 to 20 weight % of a diene while continuously feeding the composition into a reactor, in the presence of the catalyst composition including the first transition metal compound represented by the following Chemical Formula 1 and the second transition metal compound represented by the following Chemical Formula 2.

[Chemical Formula 1]

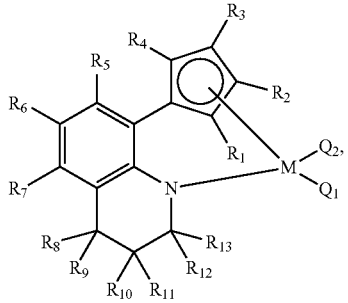

[Chemical Formula 2]

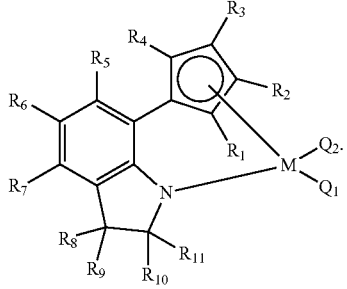

In Chemical Formulae 1 and 2, $R_1$ to $R_{13}$ may be equal to or different from each other, and may independently be hydrogen, a $C_1$-$C_{20}$ alkyl radical, a $C_2$-$C_{20}$ alkenyl radical, a $C_6$-$C_{20}$ aryl radical, a silyl radical, a $C_7$-$C_{20}$ alkylaryl radical, a $C_7$-$C_{20}$ arylalkyl radical, or a metalloid radical of a group 4 metal substituted with a hydrocarbyl, wherein 2 different neighboring groups among $R_1$ to $R_{13}$ may form an aliphatic ring or an aromatic ring by being connected with an alkylidene radical including a $C_1$-$C_{20}$ alkyl or a $C_6$-$C_{20}$ aryl radical;

M is a group 4 transition metal; and $Q_1$ and $Q_2$ may be equal to or different from each other, and may independently be a halogen radical, a $C_1$-$C_{20}$ alkyl radical, a $C_2$-$C_{20}$ alkenyl radical, a $C_6$-$C_{20}$ aryl radical, a $C_7$-$C_{20}$ alkylaryl radical, a $C_7$-$C_{20}$ arylalkyl radical, a $C_1$-$C_{20}$ alkylamido radical, a $C_6$-$C_{20}$ arylamido radical, or a $C_1$-$C_{20}$ alkylidene radical.

As recognized in the below examples, the elastic terpolymer of one embodiment satisfying said high molecular weight range and Δ tan δ of 0.5 or less that is the difference between the tan δ values at the angular frequencies of 0.2 rad/s and 100.0 rad/s can be obtained with a high yield rate and productivity by using a certain content of monomers, namely, about 40 to 70 weight % or about 50 to 70 weight % of ethylene, about 15 to 55 weight % or about 25 to 45 weight % of a $C_3$-$C_{20}$ alpha-olefin, and about 0.5 to 20 weight % or about 2 to 10 weight % of a diene, and copolymerizing the monomers in the presence of 2 kinds of specific transition metal catalysts represented by Chemical Formulae 1 and 2.

This may be due to excellent catalytic activity of said 2 kinds of specific catalysts and reactivity of the comonomers. The specific catalysts of the first and second transition metal compounds show excellent catalytic activity as the group 4 transition metal catalyst and can show excellent selectivity and copolymerization reactivity particularly to the comonomers such as alpha-olefins and dienes. Moreover, by using the 2 kinds of specific catalysts, it is possible to carry out the copolymerization so that the diene is uniformly distributed in the polymer chain with a relative high content. This seems to be because the surroundings of the metal sites of the specific catalysts of Chemical Formulae 1 and 2 are very stably maintained as a firm 5-membered ring and 6-membered ring structure by the quinoline-based amido group, and it has a structural characteristic that the monomers can easily approach. That is, the specific catalysts of Chemical Formulae 1 and 2 can form a long-chain branch-type macromer on the basis of said structural characteristic of the catalysts during the copolymerization of ethylene and alpha-olefin, and the macromer is further copolymerized by the reaction with the catalysts and can be made into the elastic terpolymer having a long-chain branch.

Moreover, said comonomers, especially dienes, can be distributed in the polymer chain more uniformly by using the 2 kinds of specific catalysts of the first and second transition metal compounds and carrying out the copolymerization with a continuous process while continuously providing the monomer composition including the monomers into the polymerization reactor.

As a result, it is possible to prepare the elastic terpolymer having high molecular weight in which the monomers are uniformly and alternately distributed and the degree of long-chain branch is high with high productivity and yield rate. Further, the elastic terpolymer can satisfy the specific relation of the Mooney viscosity (ML) and the Mooney relaxation area (MLR), and thus can satisfy excellent processability and flexibility at the same time, in addition to excellent mechanical properties due to the molecular weight.

In addition, by controlling the content of the monomers to be in the optimum range of about 40 to 70 weight % or about 50 to 70 weight % of ethylene, about 15 to 55 weight % or about 25 to 45 weight % of a $C_3$-$C_{20}$ alpha-olefin, and about 0.5 to 20 weight % or about 2 to 10 weight % of a diene, the monomers can be distributed in the polymer chain more uniformly and alternately, and it becomes possible to prepare the elastic terpolymer of one embodiment effectively satisfying the characteristics disclose above.

Therefore, according to the preparation method of another embodiment, the elastic terpolymer of one embodiment disclosed above can be prepared with high productivity and yield rate, and the elastic terpolymer can be used very preferably as the EPDM rubber that is prepared by using the group 4 transition metal catalyst and satisfies excellent mechanical properties and more improved elasticity at the same time.

However, in the cases of not using the 2 kinds of specific catalysts disclosed above, using only one kind of the catalyst, or getting out the proper content range of the monomers, especially diene, disclosed above, the elastic terpolymer prepared finally may not satisfy the high molecular weight range and the specific relation of the Mooney viscosity (ML) and the Mooney relaxation area (MLR) disclosed above.

In the method of preparing the elastic terpolymer of another embodiment, the first and second transition metal compounds represented by Chemical Formulae 1 and 2 are explained in more detail as follows.

First, in Chemical Formulae 1 and 2, the hydrocarbyl may refer to a monovalent functional group of hydrocarbons from which hydrogen atoms are eliminated, for example, it may inclusively refer to an alkyl such as ethyl and so on or an aryl such as phenyl and so on.

Further, the metalloid in Chemical Formulae 1 and 2 is an element showing intermediate character of metal and non-metal, for example it may refer to arsenic, boron, silicon, tellurium, and so on. And said M, for example, may refer to a group 4 transition metal element such as titanium, zirconium, hafnium, and so on.

Among the first and second transition metal compounds, one or more compounds selected from the group consisting of the compounds represented by the following formulae may be suitably used as the first transition metal compound of Chemical Formula 1.

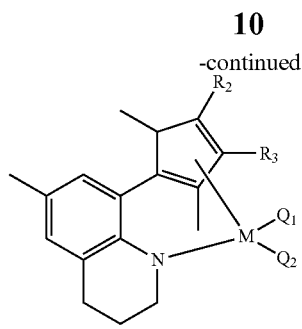

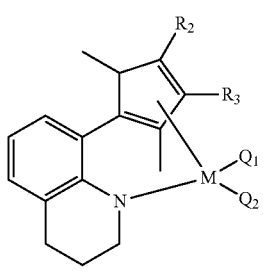

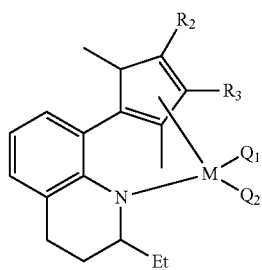

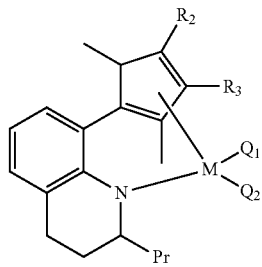

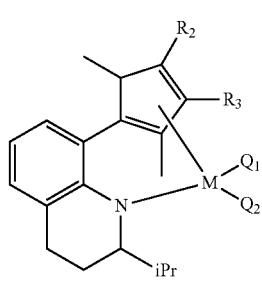

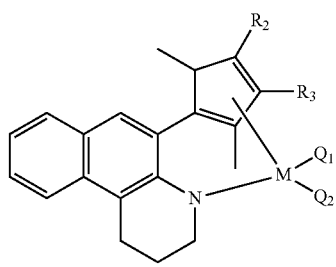

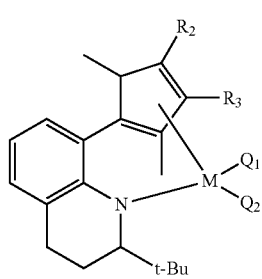

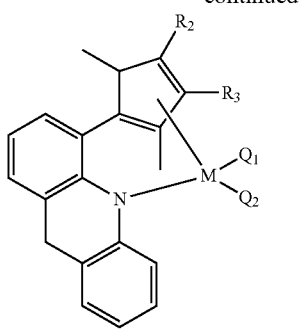
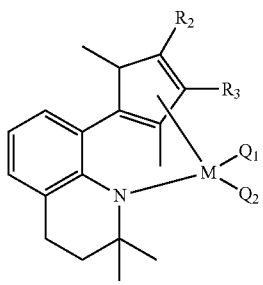
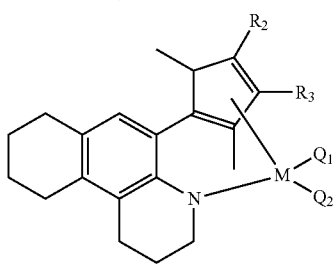
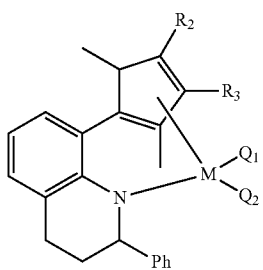

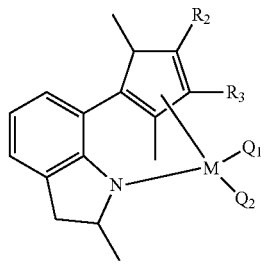
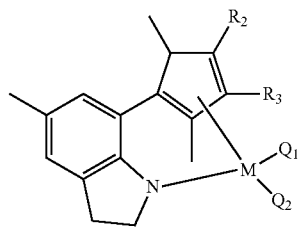
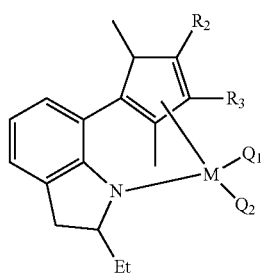
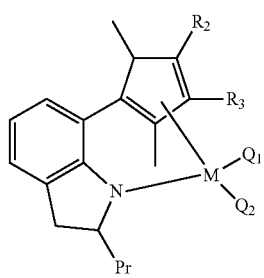
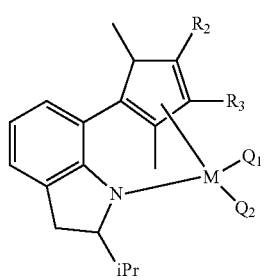

In the above formulae, $R_2$ and $R_3$ are equal to or different from each other, and are independently hydrogen or a methyl radical, M is a group 4 transition metal, and $Q_1$ and $Q_2$ are equal to or different from each other, and are independently a methyl radical, a dimethylimido radical, or a chlorine radical.

Furthermore, as the second transition metal compound of Chemical Formula 2, one or more compounds selected from the group consisting of the compounds represented by the following formulae may be suitably used.

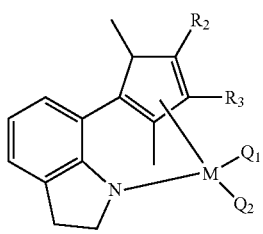
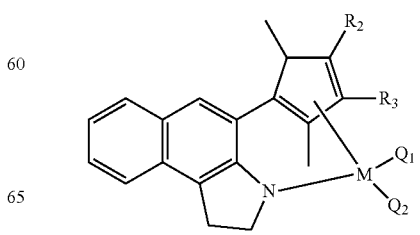

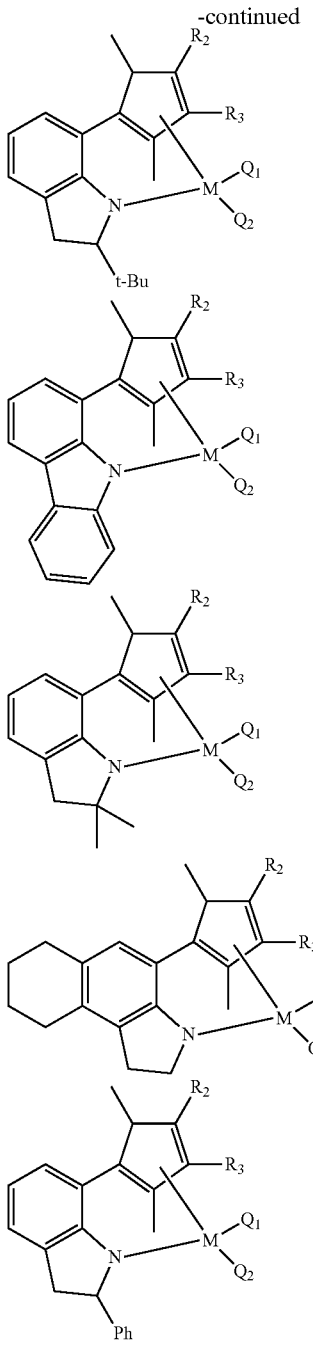

In the above formulae, $R_2$ and $R_3$ are equal to or different from each other, and are independently hydrogen or a methyl radical, M is a group 4 transition metal, and $Q_1$ and $Q_2$ are equal to or different from each other, and are independently a methyl radical, a dimethylimido radical, or a chlorine radical.

Meanwhile, the catalyst composition used in the preparation method of another embodiment may further include one or more cocatalyst compounds selected from the group consisting of the compounds represented by the following Chemical Formulae 3 to 5 in addition to the first and second transition metal compounds.

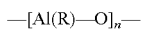 —[Al(R)—O]$_n$—          [Chemical Formula 3]

In Chemical Formula 3, R's are is equal to or different from each other, and are independently a halogen, a $C_1$-$C_{20}$ hydrocarbon, or a $C_1$-$C_{20}$ hydrocarbon substituted with a halogen; and n is an integer of 2 or more.

 D(R)$_3$          [Chemical Formula 4]

In Chemical Formula 4, R's are the same as defined in Chemical Formula 3; and D is aluminum or boron.

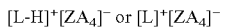 [L-H]$^+$[ZA$_4$]$^-$ or [L]$^+$[ZA$_4$]$^-$          [Chemical Formula 5]

In Chemical Formula 5, L is a neutral or cationic Lewis acid; H is a hydrogen atom; Z is a group 13 element; A's are equal to or different from each other, and are independently a $C_6$-$C_{20}$ aryl group or a $C_1$-$C_{20}$ alkyl group of which one or more hydrogen atoms are substituted with a halogen, a $C_1$-$C_{20}$ hydrocarbon, an alkoxy, or a phenoxy, or are not substituted.

In such cocatalyst compounds, for example, methylaluminoxane, ethylaluminoxane, isobutylaluminoxane, butylaluminoxane, and so on may be used as the compound represented by Chemical Formula 3.

Further, for example, trimethyl aluminum, triethyl aluminum, triisobutyl aluminum, tripropyl aluminum, tributyl aluminum, dimethylchloro aluminum, triisopropyl aluminum, tri-s-butyl aluminum, tricyclopentyl aluminum, tripentyl aluminum, triisopentyl aluminum, trihexyl aluminum, trioctyl aluminum, ethyldimethyl aluminum, methyldiethyl aluminum, triphenyl aluminum, tri-p-tolyl aluminum, dimethyl aluminum methoxide, dimethyl aluminum ethoxide, trimethyl boron, triethyl boron, triisobutyl boron, tripropyl boron, tributyl boron, and so on may be used as the compound represented by Chemical Formula 4, and among them, trimethyl aluminum, triethyl aluminum, or triisobutyl aluminum may be suitably used.

In addition, the compound represented by Chemical Formula 5 includes a non-coordinating anion which can coexist with a cation, such as a Bronsted acid. A suitable anion is one with a relatively large size and includes a single coordinating complex compound including a metalloid. Particularly, a compound including a single boron atom in the anion part is widely being used. In this respect, as the compound represented by Chemical Formula 5, a salt having an anion including a coordinating complex compound including single boron atom may be suitably used.

In the case of the trialkylammonium salt, for example, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(2-butyl)ammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-triisopropylsilyl)-2,3,5,6-tetrafluorophenyl)borate, N,N-dimethylanilinium pentafluorophenoxy tris(pentafluorophenyl)borate, N,N-diethylanilinium tetrakis(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-2,4,6-trimethylanilinium tetrakis(2,3,4, 6-tetrafluorophenyl)borate, decyldimethylammonium tetrakis(pentafluorophenyl)borate, dodecyldimethylammonium tetrakis(pentafluorophenyl)borate, tetradecyldimethylammonium tetrakis(pentafluorophenyl)borate, hexadecyldimethylammonium tetrakis(pentafluorophenyl)borate, octadecyldimethylammonium tetrakis(pentafluorophenyl)borate, eicosyldimethylammonium tetrakis(pentafluorophenyl)borate, methyldidecylammonium tetrakis(pentafluorophenyl)borate, methyldidodecylammonium tetrakis(pentafluorophenyl)borate, methylditetradecylammonium tetrakis(pentafluorophenyl)borate, methyldihexadecylammonium tetrakis(pentafluorophenyl)borate, methyldioctadecylammonium tetrakis(pentafluorophenyl)borate, methyldieicosylammonium tetrakis(pentafluorophenyl)borate, tridecylammonium tetrakis(pentafluorophenyl)borate, tridodecylammonium tetrakis(pentafluorophenyl)borate, tritetradecylammonium tetrakis(pentafluorophenyl)borate, trihexadecylammonium tetrakis(pentafluorophenyl)borate, trioctadecylammonium tetrakis(pentafluorophenyl)borate, trieicosylammonium tetrakis(pentafluorophenyl)borate, decyldi(n-butyl)ammonium tetrakis(pentafluorophenyl)borate, dodecyldi(n-butyl)ammonium tetrakis(pentafluorophenyl)borate, cotadecyldi(n-butyl)ammonium tetrakis(pentafluorophenyl)borate, N,N-didodecylanilinium tetrakis(pentafluorophenyl)borate, N-methyl-N-dodecylanilinium tetrakis(pentafluorophenyl)borate, methyldi(dodecyl)ammonium tetrakis(pentafluorophenyl)borate, and so on may be used.

In the case of the dialkylammonium salt, for example, di-(i-propyl)ammonium tetrakis(pentafluorophenyl)borate, dicyclohexylammonium tetrakis(pentafluorophenyl)borate, and so on may be used.

In the case of the carbonium salt, for example, tropylium tetrakis(pentafluorophenyl)borate, triphenylmethylium tetrakis(pentafluorophenyl)borate, benzene(diazonium)tetrakis(pentafluorophenyl)borate, and so on may be used.

Meanwhile, in the above preparation method of the elastic terpolymer, for example, the catalyst composition may be prepared by the method including the steps of bringing the first and second transition metal compounds into contact with the cocatalyst compound of Chemical Formula 3 or Chemical Formula 4 so as to obtain a mixture thereof; and adding the cocatalyst of Chemical Formula 5 to the mixture.

In the catalyst composition, the mole ratio of the first transition metal compound to the second transition metal compounds may be about 10:1 to 1:10, the mole ratio of the total transition metal compound including the first and second transition metal compounds to the cocatalyst compound of Chemical Formula 3 or Chemical Formula 4 may be about 1:5 to 1:500, and the mole ratio of the total transition metal compound to the cocatalyst compound of Chemical Formula 5 may be about 1:1 to 1:10.

In the preparation method of the elastic terpolymer, the catalyst composition may further include a reaction solvent and the reaction solvent may be a hydrocarbon solvent such as pentane, hexane, or heptane; or an aromatic solvent such as benzene or toluene, but it is not limited to them.

As disclosed above, propylene, 1-butene, 1-hexene, 1-octene, 1-pentene, 4-methyl-1-pentene, 1-hexene, 1-heptene, 1-decene, 1-undecene, 1-dodecene, and so on may be used as the alpha-olefin included in the monomer composition, and unconjugated diene-based monomers may be used as the diene. Among them, the monomers commonly used in the preparation of the EPDM rubber, for example, propylene may be appropriately used as the alpha-olefin, and unconjugated diene-based monomers such as 5-ethylidene-2-norbornene, 5-methylene-2-norbornene, 4-hexadiene, and so on may be appropriately used as the diene.

In the preparation method of the terpolymer according to another embodiment, the copolymerizing step may be carried out at a temperature of about 100 to 170° C., or about 100 to 160° C. When the copolymerization temperature is too low, it may be difficult to synthesize the elastic terpolymer in which 3 kinds of monomers are uniformly and alternately distributed, and when the polymerization reaction temperature is too high, the monomer or the prepared terpolymer may be degraded by heat. Such copolymerization may be carried out according to a solution polymerization method, particularly, according to a continuous solution polymerization method. The catalyst composition disclosed above may be used in the form of a homogeneous catalyst that is dissolved in the solution.

For carrying out the continuous solution polymerization, the copolymerizing step may be carried out while continuously providing the monomer composition, the first and second transition metal compounds, and the catalyst composition selectively including the cocatalyst compound in the form of a liquid to the reactor, and the copolymerizing step may be continuously carried out while continuously discharging the copolymerized elastic terpolymer from the reactor.

By carrying out such continuous solution polymerization, the elastic terpolymer satisfying the characteristics of one embodiment can be obtained more effectively with high productivity and yield rate.

Advantageous Effects

According to the present invention, as disclosed above, the elastic terpolymer having a long-chain branch which shows excellent processability and more improved elasticity and flexibility and that can be very preferably used to the EPDM rubber is prepared by the group 4 transition metal catalyst.

Furthermore, according to the present invention, the preparation method of the elastic terpolymer which can prepare the elastic terpolymer with high productivity and yield rate is provided.

The elastic terpolymer having a long-chain branch obtained according to the present invention can overcome the limit of the EPDM rubber prepared by an existing metallocene group 4 transition metal catalyst and satisfy excellent elasticity and flexibility in addition to other properties. Therefore, it is possible to utilize the unique strengths of the group 4 transition metal catalyst and the elastic terpolymer can be used as the EPDM rubber very preferably.

DETAILED DESCRIPTION OF THE EMBODIMENTS

Figure 1:
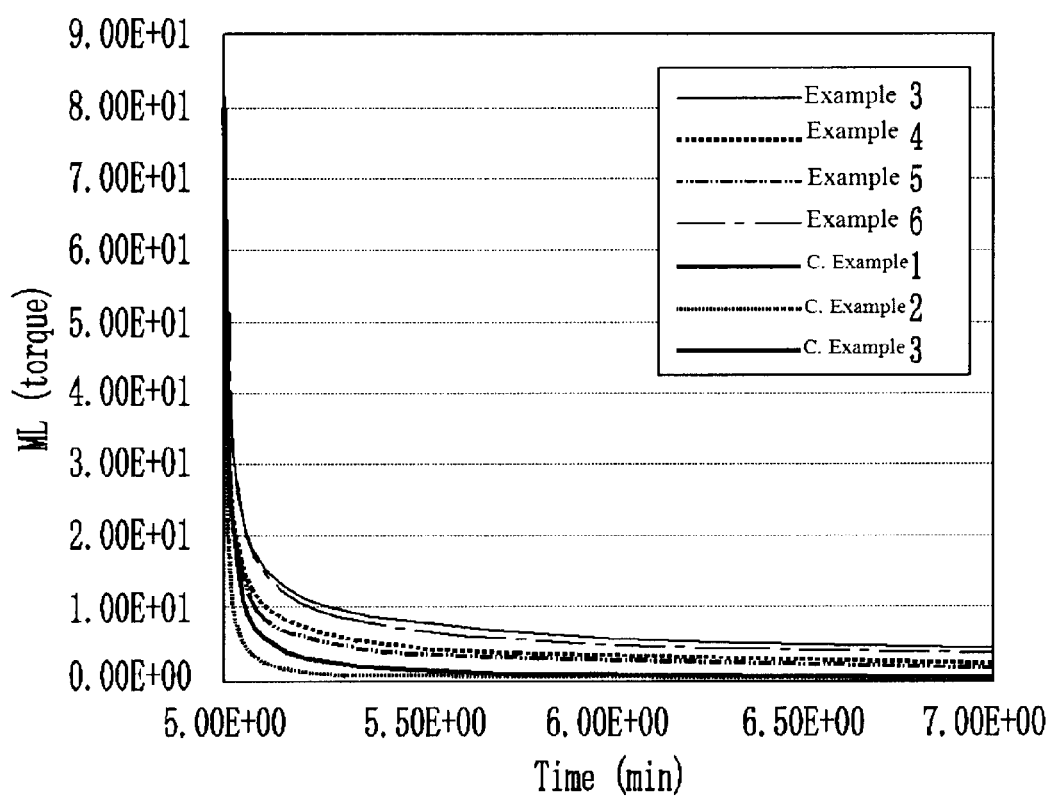
FIG. 1 is a Mooney relaxation curves of Examples 3 to 6 and Comparative Examples 1 to 3.

Hereinafter, the present invention is explained in more detail by referring to the following examples. However, the following examples are only for exemplifying the invention and the substance of the invention is not limited to or by them.

The following examples and comparative examples were carried out by using a standard Schlenk line and a glove-box under a nitrogen atmosphere for blocking the contact with air and moisture, and the organic solvent for the reaction was used after being purified by a standard method. The synthesized ligands and catalysts were confirmed by using a 400 MHz nuclear magnetic resonance (NMR) spectrometer and an X-ray spectrometer.

<Synthesis of Ligands and Transition Metal Compounds>

In the following examples, [(1,2,3,4-tetrahydroquinolin-8-yl)tetramethylcyclopentadienyl-eta5,kapa-N]titanium dimethyl and [(2-methylindolin-7-yl)tetramethylcyclopentadienyl-eta5,kapa-N]titanium dimethyl were used as the first and second transition metal compounds, respectively, and N,N-dimethylanilinium tetrakis(pentafluorophenyl)borate and triisobutyl aluminum were used as the cocatalyst compounds. The first and second transition metal compounds were prepared according to the same method as in Examples 2 and 14 of Korean Pat. No. 0,976,131, and the cocatalyst was prepared according to the same method as in Example 9 of Korean Pat. No. 0,820,542.

Examples 1 to 7

Preparation of the Elastic Terpolymer of Ethylene, Propylene, and 5-ethylidene-2-norbornene The copolymerization reaction of ethylene, propylene, and 5-ethylidene-2-norbornene was continuously carried out by using a 2 L pressure reactor. Hexane, as a polymerization solvent, was continuously fed to the reactor through the bottom with the feeding speed of 6.7 kg per hour, and the polymerized solution was continuously taken out through the upper part.

As the first and second transition metal compounds, said [(1,2,3,4-tetrahydroquinolin-8-yl)tetramethylcyclopentadienyl-eta5,kapa-N]titanium dimethyl and [(2-methylindolin-7-yl)tetramethylcyclopentadienyl-eta5,kapa-N]titanium dimethyl were used in the form of being dissolved in hexane, and they were fed to the reactor with the feeding speed of 24 to 60 μmol per hour. As the cocatalyst compound, said N,N-dimethylanilinium tetrakis(pentafluorophenyl)borate was used in the form of being dissolved in toluene, and it was fed to the reactor with the feeding speed of 1800 to 3200 μmol per hour.

The copolymerization was continuously carried out while feeding ethylene, propylene, and 5-ethylidene-2-norbornene, the monomers, to the reactor with the feeding speed of 890 to 900 g per hour, 450 to 550 g per hour, and 80 to 250 g per hour, respectively.

The copolymerization temperature in the reactor was controlled to be 130 to 160° C. while increasing the feeding speed of 5-ethylidene-2-norbornene by 0.5 mL/min from 1 mL/min around 160° C.

The elastic terpolymers of Examples 1 to 7 were continuously prepared in the form of homogeneous solution by carrying out the continuous solution copolymerization under the conditions disclosed above, and the polymerized solutions taken out through the upper part of the reactor were made into the terpolymers of Examples 1 to 7 after being vacuum dried in a vacuum oven at 60° C. after the polymerization reaction was terminated in the presence of ethanol.

Comparative Examples 1 to 3

Commercialized Elastic Terpolymer of Ethylene, Propylene, and 5-ethylidene-2-norbornene DOW 4570, the commercialized EPDM rubber prepared by a metallocene catalyst, was used as the elastic terpolymer of Comparative Example 1, DOW 4640 was used as the elastic terpolymer of Comparative Example 2, and DOW 4725 was used as the elastic terpolymer of Comparative Example 3.

The content of each monomer, activity of catalyst, weight average molecular weight, and molecular weight distribution (PDI) of the terpolymers obtained in the examples and comparative examples are listed in the following Table 1. Here, the weight average molecular weight was measured by PL-GPC 220 equipment of Polymer Laboratory Co. equipped with 3 linear-mixed bed columns, at 160° C. with the flow rate of 1.0 ml/min by using 1,2,4-trichlorobenzene as the solvent.

TABLE 1

|  | Polymerization Temperature (° C.) | Activity of Catalyst (kg/mmol · h) | ethylene (wt %) | propylene (wt %) | 5-ethylidene-2-norbornene (wt %) | Mw (g/mol) | PDI |
|---|---|---|---|---|---|---|---|
| Example 1 | 135 | 18.3 | 50.2 | 44.7 | 5.1 | 256,756 | 2.83 |
| Example 2 | 135 | 48.2 | 51.8 | 42.6 | 4.7 | 194,077 | 2.82 |
| Example 3 | 153 | 43.3 | 62.3 | 25.4 | 12.3 | 289,000 | 3.15 |
| Example 4 | 160 | 40.0 | 64.0 | 23.7 | 12.3 | 229,000 | 2.62 |
| Example 5 | 159 | 30.7 | 64.6 | 23.5 | 11.9 | 224,375 | 3.43 |
| Example 6 | 158 | 29.6 | 66.3 | 21.9 | 11.8 | 267,000 | 2.73 |
| Example 7 | 143 | 49.0 | 53.0 | 42.5 | 4.6 | 147,851 | 2.65 |
| Comparative Example 1 |  |  | 47.2 | 47.5 | 5.3 | 253,740 | 2.41 |
| Comparative Example 2 |  |  | 51.2 | 436. | 5.2 | 209,000 | 2.97 |
| Comparative Example 3 |  |  | 69.9 | 24.9 | 5.1 | 249,077 | 2.79 |

EXPERIMENTAL EXAMPLE 1

Measurement on the Mooney viscosity and the Mooney Relaxation Area (MLR)

The Mooney viscosity and the MLR were measured by using a Mooney viscometer (MV 2000 device model of Monsanto Co.) according to ASTM D1646-04. The sample was prepared by treating the terpolymer sample with an antioxidant (Irganox 1076) and making the same into a sheet by using a press mold. The sample was treated at 125° C. with a 1+4+2 condition by preheating the same for 1 min, measuring the Mooney viscosity for 4 min, and measuring the Mooney relaxation for 2 min.

MLR is the integration value of the Mooney stress relaxation during 2 min from when 1 s has passed after the rotor stopped, and the calculation equation may be represented by the following General Equation 2.

$$MLR = \frac{k}{\alpha+1}[t^{[n+1]} - 1] \quad \text{[General Equation 2]}$$

$M$ = Mooney Viscometer torque($MU$)

$k$ = intercept $\alpha$ = slope $t$ = measuring time

Figure 2:
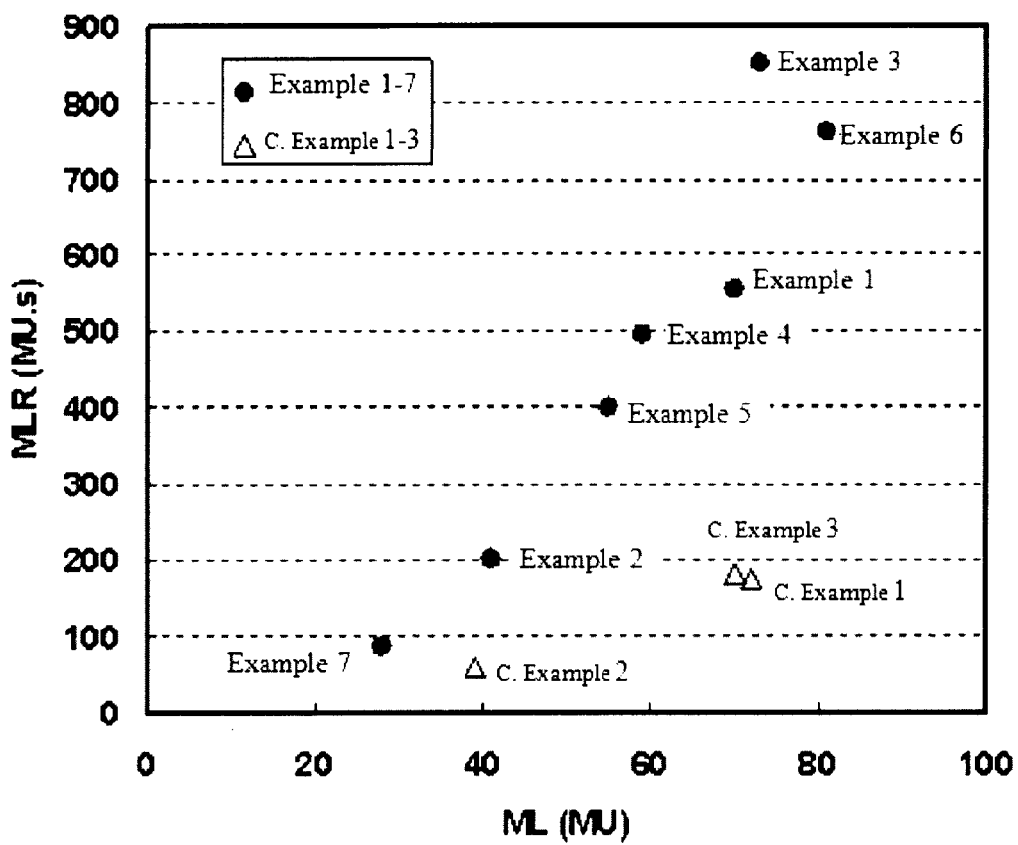
FIG. 2 is a graphs of the Mooney relaxation area (MLR) to the Mooney viscosity (ML) of Examples 1 to 7 and Comparative Examples 1 to 3.

The graphs of the Mooney relaxation curve and the MLR/ML to the ML of the terpolymers of the examples and the comparative examples are illustrated in FIGS. 1 and 2, and the Mooney viscosities, the MLRs, the ratios of MLR/ML, and the values of General Equation 1 are listed in the following Table 2.

TABLE 2

|  | ML (MU) | MLR (MU*s) | MLR/ML | [MLR/(ML)$^2$]*100 | MWD |
|---|---|---|---|---|---|
| Example 1 | 70 | 556 | 7.9 | 11.2 | 2.83 |
| Example 2 | 41 | 202 | 5.0 | 12.3 | 2.82 |
| Example 3 | 73 | 852 | 11.7 | 16.0 | 3.15 |
| Example 4 | 59 | 496 | 8.4 | 14.1 | 2.62 |
| Example 5 | 55 | 399 | 7.2 | 13.1 | 3.43 |
| Example 6 | 81 | 761 | 9.3 | 11.5 | 2.73 |
| Example 7 | 28 | 87 | 3.1 | 11.4 | 2.65 |
| Comparative Example 1 | 72 | 173 | 2.4 | 3.3 | 2.41 |
| Comparative Example 2 | 39 | 59 | 1.5 | 3.8 | 2.97 |
| Comparative Example 3 | 70 | 182 | 2.6 | 3.7 | 2.79 |

As illustrated in FIG. 1, it is recognizable that the graphs of the Mooney relaxation curves of Examples 3 to 6 decrease slowly but the graphs of Comparative Examples 1 to 3 decrease rapidly. From this, it is possible to know that the terpolymers of the examples have the increased Mooney relaxation area, the area below the graph, while having similar viscosity to the terpolymer of the comparative examples, and it is inferable that this is due to the high degree of the long-chain branch in the polymer.

Particularly, as listed in Table 2, Examples 1, 3, and 6 and Comparative Examples 1 and 3 show similar Mooney relaxation values and have similar viscosities, but the Mooney relaxation areas of the terpolymers prepared in the examples are apparently higher than those of the comparative examples. Therefore, it is possible to know that the terpolymers of the examples have a high degree of the long-chain branch in the polymer.

Further, from the MLR value to the ML shown in FIG. 2 and Table 2, it is possible to know that Examples 1 to 7 show higher MLR values and MLR/ML values to the same ML value than Comparative Examples 1 to 7, and particularly, Examples 1 to 7 show the [(MLR)/(ML)$^2$]*100 value of 10 or more but Comparative Examples 1 to 3 show the value of 4 or less such that the difference between them is large.

From the results of the MLR/ML value to the ML and the value of General Equation 1, it is recognizable that the elastic terpolymers of the examples are superior in processability and are suitable for the extrusion molding, and have excellent mechanical properties, because they have the EPDM structure having a long-chain branch which can be prepared by introducing a specific diene thereto in the presence of a specific catalyst and have narrow molecular weight distributions of 3.5 or less.

EXPERIMENTAL EXAMPLE 2

Garvey-Die Extrusion Test

Figure 3:
FIG. 3 is a surface photograph of the extrudate of the elastic terpolymer prepared in Example 1 that is extruded through a Garvey die with a rotor speed of 60 rpm.
Figure 3:
Figure 3:
Figure 4:
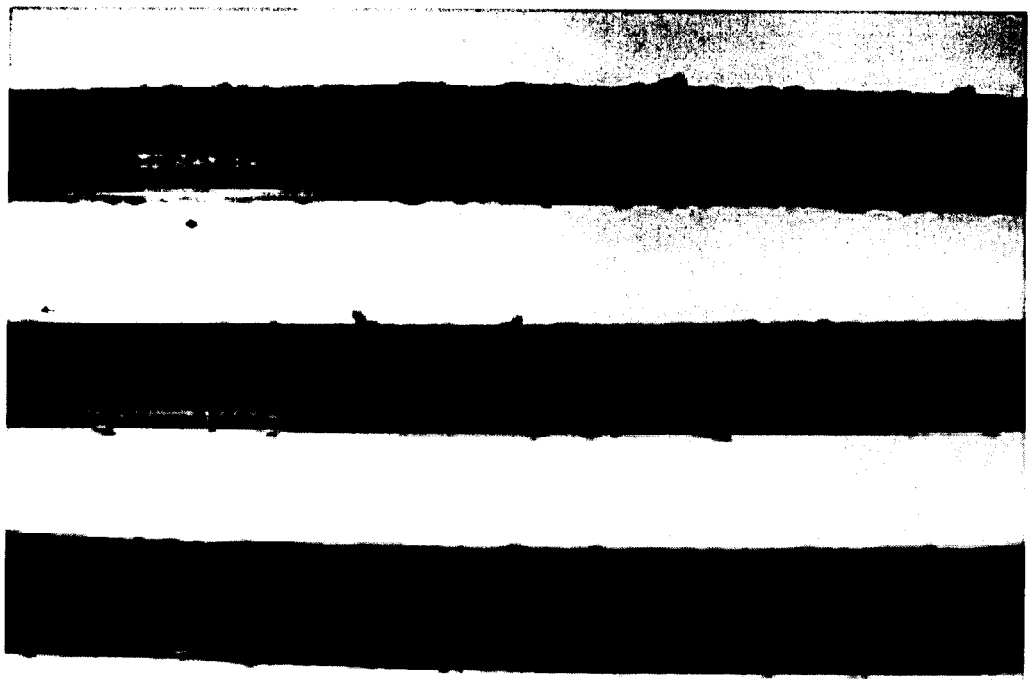
FIG. 4 is a surface photograph of the extrudate of the elastic terpolymer prepared in Comparative Example 1 that is extruded through a Garvey die with a rotor speed of 60 rpm.

The extrusion processability was evaluated by a Garvey die extrusion test according to ASTM 2230. The samples for the Garvey die extrusion test were prepared as follows. 100 parts by weight of the elastic terpolymers prepared in Examples 1 and 2 and Comparative Examples 1 and 2, 75 parts by weight of paraffin oil, 125 parts by weight of carbon black, 5 parts by weight of ZnO, and 1 part by weight of stearic acid were mixed by using a 1.6 L Banbury mixer of Farrell Co. with a rotor speed of 60 rpm for 6 min at 100 to 120° C. The mixtures were extruded through the Garvey die extruder at a die temperature of 105° C. by varying the rotor speed to 45 or 60 rpm, and the surface and edge characteristics were evaluated. The results of the Garvey die test of Examples 1 and 2 and Comparative Examples 1 and 2 are listed in Table 3, and the photographs of the surface of the Garvey die extrudates of the elastic terpolymers of Example 1 and Comparative Example 1 are illustrated in FIGS. 3 and 4, respectively.

TABLE 3

|  |  |  |  | Characteristics of Extrudates | |
|---|---|---|---|---|---|
| Sample | Rotor Speed (rpm) | Extrusion Production | *Die expansion index | Surface Characteristic | Edge Characteristic |
| Example 1 | 45 | 35 | 0.34 | B | 9 |
|  | 60 | 43 | 0.45 | A | 9 |
| Example 2 | 45 | 54 | 0.41 | A | 9 |
|  | 60 | 62 | 0.45 | A | 10 |
| Comparative Example 1 | 45 | 33 | 0.32 | C | 6 |
|  | 60 | 49 | 0.41 | C | 7 |
| Comparative Example 2 | 45 | 51 | 0.44 | C | 7 |
|  | 60 | 60 | 0.49 | B | 7 |

*Die expansion index is the volume change per minute divided by the length change per minute during the extrusion.

Examples 1 and 2 and Comparative Examples 1 and 2 are samples having similar composition and Mooney viscosity, and, as shown in Table 3, it is possible to recognize that they show similar extrusion production and die expansion index but the surface characteristic of Examples 1 and 2 is apparently superior to those of Comparative Examples 1 and 2 when they are subjected to the Garvey die extrusion test.

Furthermore, from FIGS. 3 and 4, the photographs of the extrudates of Example 1 and Comparative Example 1, it is possible to recognize that the surface characteristic and the edge shape of Example 1 are more uniform and smooth than those of Comparative Example 1.

That is, it is possible to recognize that the elastic terpolymers of Examples 1 and 2 show superior extrusion processability and surface characteristic to the existing terpolymer including 5-vinyl-2-norbornene (VNB) or dicyclopentadiene (DCPD) as the diene, by introducing a long-chain branch thereto by using the specific diene and group 4 transition metal catalyst.

The invention claimed is:

1. An elastic terpolymer of 50.2 to 66.3 weight % of ethylene, 21.9 to 44.7 weight % of propylene, and 4.6 to 12.3 weight % of 5-ethylidene-2-norbornene obtained in the presence of a group 4 transition metal catalyst, of which
   i) the weight average molecular weight measured by GPC is 100,000 to 500,000, and
   ii) the Mooney viscosity (ML) and the Mooney relaxation area (MLR) measured by a Mooney viscometer (1+4+2@ 125 ° C.) satisfy the following General Equation 1:

$$11.2 \leq [MLR/(ML)^2]*100 \leq 16.0.$$ [General Equation 1]

2. The elastic terpolymer according to claim 1, wherein a ratio of MLR/ML is 3 or more.

3. The elastic terpolymer according to claim 1, wherein the Mooney viscosity is 20 MU or more.

4. The elastic terpolymer according to claim 1, having density of 0.840 to 0.895 g/cm$^3$.

5. The elastic terpolymer according to claim 1, having a molecular weight distribution of 2 to 4.

* * * * *